(12) United States Patent
Azzam et al.

(10) Patent No.: US 8,560,567 B2
(45) Date of Patent: Oct. 15, 2013

(54) AUTOMATIC QUESTION AND ANSWER DETECTION

(75) Inventors: Saliha Azzam, Redmond, WA (US); Nicholas Caldwell, Bellevue, WA (US); Diego Perez Del Carpio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/170,879

(22) Filed: Jun. 28, 2011

(65) Prior Publication Data

US 2013/0007037 A1    Jan. 3, 2013

(51) Int. Cl.
*G06F 17/30* (2006.01)

(52) U.S. Cl.
USPC ........................................ 707/769

(58) Field of Classification Search
None
See application file for complete search history.

(56) References Cited

U.S. PATENT DOCUMENTS

| | | | |
|---|---|---|---|
| 6,028,601 A * | 2/2000 | Machiraju et al. ............ | 715/705 |
| 6,346,952 B1 | 2/2002 | Shtivelman | |
| 7,058,564 B2 * | 6/2006 | Ejerhed .......................... | 704/1 |
| 2006/0286530 A1 | 12/2006 | Forrest et al. ................. | 434/323 |
| 2008/0104065 A1 * | 5/2008 | Agarwal et al. .................. | 707/6 |
| 2008/0109735 A1 * | 5/2008 | Vuong .......................... | 715/752 |
| 2008/0195378 A1 | 8/2008 | Nakazawa et al. | |
| 2009/0186330 A1 * | 7/2009 | Brownholtz et al. ......... | 434/362 |
| 2009/0222391 A1 * | 9/2009 | Buda et al. ...................... | 706/45 |
| 2009/0276419 A1 * | 11/2009 | Jones et al. ...................... | 707/5 |
| 2009/0292687 A1 | 11/2009 | Fan et al. | |
| 2010/0063797 A1 | 3/2010 | Cong | |
| 2010/0076978 A1 | 3/2010 | Cong | |
| 2010/0191686 A1 | 7/2010 | Wang | |
| 2011/0010177 A1 | 1/2011 | Nakano et al. | |

OTHER PUBLICATIONS

Hong, Liangjie et al. A Classification-based Approach to Question Answering in Discussion Boards. Published Date: Sep. 2006. http://www.cse.lehigh.edu/~brian/pubs/2009/SIGIR-QA/paper.pdf. pp. 8.

Carenini, Giuseppe et al. Summarizing Email Conversations with Clue Words. Published Date: 2007. http://www2007.org/papers/paper631.pdf. pp. 10.

Borsboom, Alexander et al. Collecting the Data Report. Published Date: May 2007. http://ilps.science.uva.nl/Teaching/II0607/twiki/pub/P1collect/DocumentLayout/Report_v13.pdf. pp. 20.

Kwong, Helen et al. Detection of Imperative and Declarative Question-Answer Pairs in Email Conversations. Retrieved Date: Sep. 8, 2010. http://ijcai.org/papers09/Papers/IJCAI09-254.pdf. pp. 6.

(Continued)

*Primary Examiner* — Fred I Ehichioya
*Assistant Examiner* — Richard Bowen
(74) *Attorney, Agent, or Firm* — Merchant & Gould

(57) ABSTRACT

Automatic detection of question and answer pairs contained in electronic communications channels is provided. Communications channels for a given enterprise, for example, emails, text message strings, and discussion forum strings are analyzed according to one or more features or patterns that are indicative of questions for detecting whether one or more questions are posed in a given communication. Next, answers that are relevant to identified questions are similarly identified by analyzing one or more communications for features and patterns that are indicative of answers to a question, and more particularly, to an identified question. Once an identified question is linked to an identified answer, the linked question and answer pair is stored in a publicly available repository for future reference by users having access to the repository.

20 Claims, 5 Drawing Sheets

(56) References Cited

OTHER PUBLICATIONS

Shrestha, Lokesh et al. 2004. Detection of question-answer pairs in email conversations. In Proceedings of Coling, pp. 889-895. http://acl.ldc.upenn.edu/C/C04/C04-1128.pdf.

Yang, Wen-Yun et al. Structural Support Vector Method for Extracting Contexts and Answers of Questions from Online Forums. In Proceedings of the 2009 Conference on Empirical Methods in Natural Language Processing. pp. 514-523. Singapore. Aug. 6-7, 2009. c 2009 ACL and AFNLP. http://www.aclweb.org/anthology/D/D09/D09-1054.pdf.

International Search Report and Written Opinion for PCT/US2012/043005 mailed Feb. 1, 2013.

\* cited by examiner

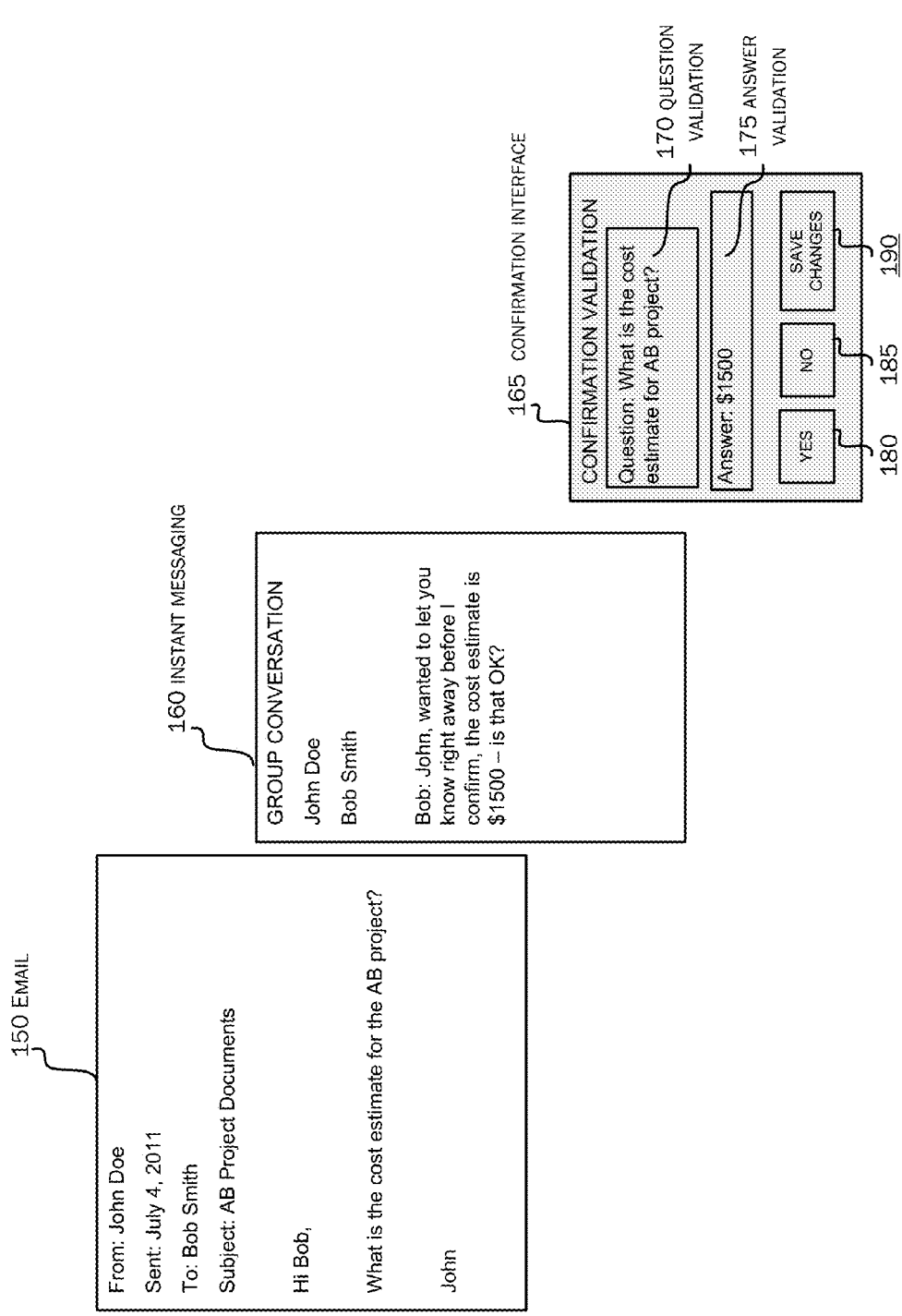

AUTOMATIC QUESTION AND ANSWER DETECTION

BACKGROUND

Within any number of business, social or academic enterprises it is often the case that electronic mail (e-mail) or electronic discussion lists are used as an unofficial repository for information exchanged among various users in the enterprise or among various users and persons outside the enterprise. For example, when a given user has a question they, he/she may e-mail one or more co-workers or members of a given discussion list to find an answer. Thus, knowledge or information is transferred between members of the enterprise or among members of the enterprise and persons outside the enterprise. Unfortunately, with this approach in the transfer of information and knowledge among various persons, the information and/or knowledge remains stored in messages contained in electronic mail boxes, instant message storage, blogs or other storage of the various users. Thus, the information or knowledge remains unstructured and thus hard to parse for analysis, subject to privacy restrictions where, for example, individual electronic mail boxes are visible only by one person, and the information and/or knowledge is subject to frequent deletion as message storage are cleaned out by users. Indeed, even though, for example electronic mail may be one of the most commonly used methods for transferring knowledge and/or information within a given enterprise or among members of an enterprise and persons outside the enterprise, it is also ineffective in terms of making the knowledge and/or information commonly available and persistently available to other users.

It is with respect to these and other considerations that the present invention has been made.

SUMMARY

Embodiments of the present invention solve the above and other problems by providing automatic detection of question and answer pairs contained in electronic communications channels, for example, electronic mail (email) strings or discussion lists, instant messages, blogs or other channels followed by storage of the question and answer pairs for subsequent use.

According to embodiments, communications channels for a given enterprise, for example, e-mails, text message strings, discussion forum strings, instant messages, blogs and the like are analyzed according to one or more features or patterns that are indicative of questions for detecting whether one or more questions are posed in a given communication. Next, answers that are relevant to identified questions are similarly identified by analyzing one or more communications for features and patterns that are indicative of answers to a question, and more particularly, to an identified question. Once an identified question is linked to an identified answer, the linked question and answer pair is stored in a publicly available repository for future reference by users having access to the repository.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings:

FIG. 1B illustrates a first application user interface associated with a first channel containing a question, a second user interface associated with a second channel containing an answer, and a third application user interface seeking validation.

DETAILED DESCRIPTION

Figure 1A:
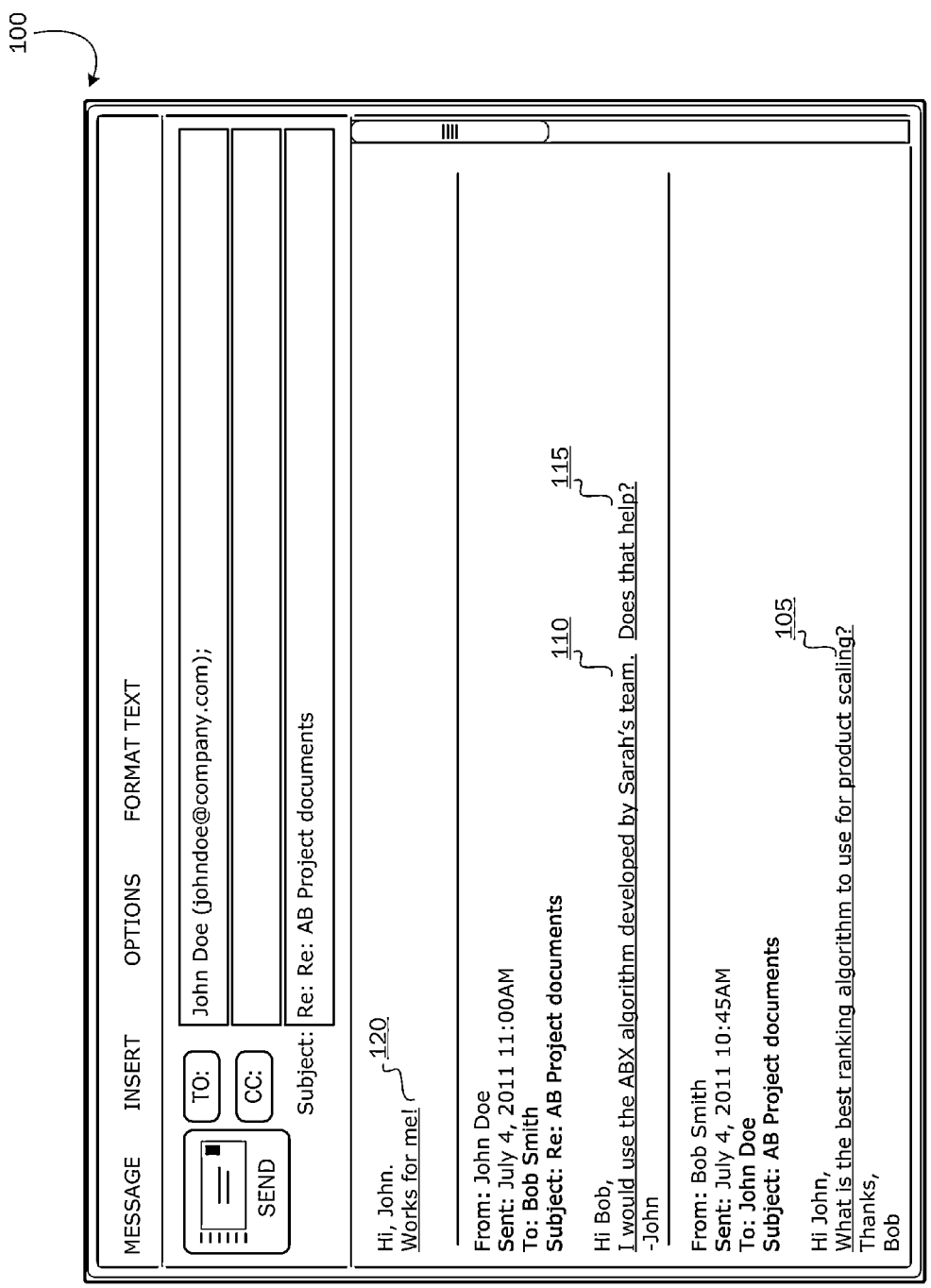
FIG. 1A illustrates a screen shot of a software application user interface in which an electronic mail exchange is illustrated.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As briefly described above, embodiments are directed to automatically detecting and storing question and answer pairs contained in electronic communications between and among various communicating users. According to embodiments of the invention, electronic conversation threads, for example, electronic mails, discussion lists, discussion boards, text messages, and the like, are analyzed for the occurrence of question and answer pairs. Identified question and answer pairs are extracted from associated electronic conversation threads and are stored in a question and answer (hereinafter "QnA") store for subsequent use as a knowledge item. For example, if a first user asks a question in an email to a second user, and the second user answers the question in a responsive email or other electronic communication, the question and answer pair may be identified, extracted and stored so that other users needing an answer to the same or similar question may find the answer in the QnA store. Thus, the QnA store becomes a knowledge repository for answers to various questions regardless of whether those questions are asked frequently or not.

As described herein, an electronic conversation may include any electronic communication channel, or combination thereof, in which questions and subsequent answers may be identified and extracted. For example, a question from a first user may be posed to a second user via an electronic mail. The second user may respond to the first user via an electronic mail or via some other suitable channel, such as text messaging, discussion lists, discussion boards, message boards, and the like. According to embodiments, once a question is identified in one communication channel, e.g., email, a responsive answer may be identified in the same or other communication channel, e.g., email, text message, discussion list, discussion board, instant message, blog, etc. For purposes of description herein, all forms of electronic communication channels will be described as generally as a "communication."

According to embodiments, at run time, a given communication item such as an email or text message, is retrieved or received and is preprocessed by splitting the communication item into one or more text components. The one or more text components may include breaking the text into separate sentences, followed by splitting the sentences into tokens (e.g., individual words, acronyms, number sequences, such as zip codes, etc.). In addition to preprocessing the text of the communication item, any metadata associated with the communication item is similarly preprocessed into sentences and tokens.

A question detector application checks the communication item and metadata text components (e.g., tokens of the subject) for features that may be used to identify a given sentence as a question. Such features may consume a variety of identification items, such as communication author, communication recipients, CC line information, subject line information for the communication item, date and time of the communication item, communication message, and the like. Such metadata items, consumed into content features, may be used for question and answer detection. For example, does a communication recipient include only one user or several, or are the subject line topic tokens overlapping with question candidate tokens, and the like. Based on the extracted text components (e.g., sentences or tokens) features, question candidates are identified. Question candidates are filtered and ranked.

An answer extractor application seeks answers to identified and ranked question candidates within the same communication item thread, e.g., email or text message thread, or in other communication channels, or in existing databases, such as the QnA store. Candidate answers are identified by comparing text components (sentences and tokens) from other communication items (e.g., same communication item thread) with the sentences and tokens comprising the identified question, by comparing, for example position of the candidate answer in the communication thread relative to the candidate question, and by reviewing other sources of information such as previously identified and stored questions and answer pairs in the QnA store, previously stored frequently asked questions, and the like. Other indicia may be used to determine whether an answer to a question is contained in the text. For example, indicia may include whether the text was from a recipient in response to the sender, the time/day of the response, the similarity in communication channel, and the like.

In addition, other sources of information may be utilized in the identification of question and answer pairs, for example, known and stored expertise information about participants in the communication conversation. For example, if a recipient of an electronic mail message is tagged with a particular expertise tagging, for example, "software development analyst," such information about the recipient of the electronic mail item may be used to associate a responsive electronic mail item from that recipient with a previously posed and identified question. For example, the expertise tag may be extracted from title information contained in directory service information. For another example, a store of information associated with a given project workspace may include information about the members of the project workspace, including information about the expertise or skill of each member. Tags (e.g., expertise tags) may be applied to each member's identification to provide helpful knowledge information about each member.

Once a question and answer pair is identified, the question and answer pair may be presented to one or more users, for example, participants in the communication conversation, for verification that the identified answer is indeed responsive to the identified question. Verification by such users may be used to enhance the determination that the identified question and answer comprising the identified question and answer pair belong together, but such verification is not required for designating a given question and answer pair. That is, a question and answer pair may be identified automatically as described above without user interaction, but user verification may be used to enhance the determination. For example, a user involved in a conversation may verify the question and answer determination. In the alternative, a third party may verify the question and answer determination. As described below, one or more questions may be determined for which corresponding answers are not determined, and user verification may be used to verify a determined question apart from a question and answer pairing.

FIG. 1A illustrates a screen shot of a software application user interface in which an electronic mail exchange is illustrated. The user interface illustrated in FIG. 1A is illustrative of any user interface display operative to display one or more communication conversation items. For example the user interface 100, illustrated in FIG. 1A, may be illustrative of an electronic mail user interface for allowing entry, edit, display, response to and the like of electronic mail communications. Similarly, the user interface 100 may be illustrative of a mobile computing device (e.g., mobile telephone or tablet personal computer) for displaying text-based messages between users. The user interface 100 likewise may be illustrative of a user interface for displaying communications exchanged between users via a discussion list, a discussion board, a message exchange/board, instant messaging, blogs, and the like.

Referring still to FIG. 1A, an electronic mail thread is illustrated with which the question and answer detection methods and systems of the present invention may be described by example. A first electronic mail string 105 is illustrated in which a first question "What is the best algorithm to use for product scaling?" is posed from a first user to a second user. A responsive email string 110 is illustrated having a first answer "I would use the ABX algorithm developed by Sarah's team" and posing a second or follow-up question "Does that help?". A third electronic mail string 115 is illustrated having an answer "Works for me" in response to the second question posed in the responsive email string 110.

According to embodiments of the invention, as briefly described above, and as described in further detail below, the example electronic mail strings illustrated in FIG. 1A may be analyzed by the question detector application for extracting candidate questions, and the electronic mail items may be further analyzed by the answer detector application for identifying candidate answers to the identified questions for identifying question and answer pairs. For example a first question and answer pair that may be identified from the electronic mail thread illustrated in FIG. 1A may include the question "What is the best algorithm to use for product scaling" paired with the answer "I would use the ABX algorithm developed by Sarah's team". A second question and answer pair that may be identified may include the question "Does that help?" paired with the answer "Works for me." Once the two example question and answer pairs are determined as being properly paired together either via the question detector application and the answer detector application, or via these applications in concert with user verification, the determined question and answer pairs may be stored for subsequent use.

FIG. 1B illustrates a first application user interface associated with a first channel containing a question, a second user interface associated with a second channel containing an answer, and a third application user interface seeking validation. In the example illustrated by FIG. 1B, a first email 150 has been authored containing a question. The question is authored in a first communication channel (email). A recipient has replied in an instant message 160 using a second communication channel of instant messaging. FIG. 1B illustrates how a question may be stored or delivered using a first communication channel, and the answer may be contained or delivered using a second communication channel. FIG. 1B also illustrates an example embodiment for validation of a question and answer. Confirmation interface 165 may show a user, such as for example the receiver or sender, the question 170 parsed from the QnA system, and/or the answer 175 parsed from the QnA system. In the example interface 165, a user may press "Yes" 180 to store the suggested question 170 and answer 175 pair. A user may press "No" 185, to not store the question 170 and answer 175 pair. For example, a user may wish to press "No" 185 for privacy reasons. A user may modify the question 170 and answer 175 and store the modified changes.

Figure 2:
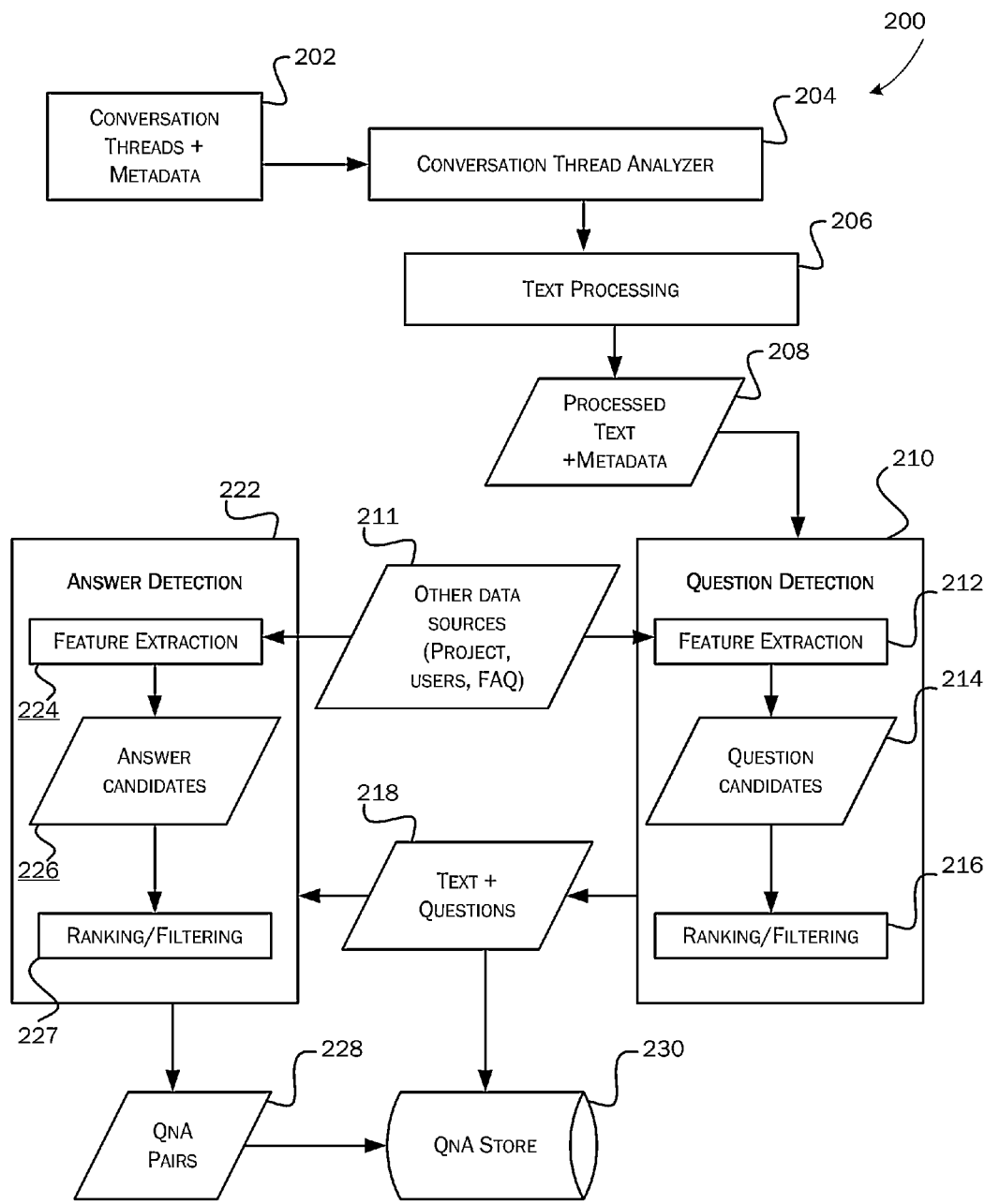
FIG. 2 is a simplified block diagram illustrating a system architecture and process flow for automatically detecting question and answer pairs in electronic communications.

FIG. 2 is a simplified block diagram illustrating a system architecture and process flow for automatically detecting question and answer pairs in electronic communications. Referring to the system 200, at operation/system component 202 one or more conversation threads and associated metadata are retrieved for analysis and determination of one or more question and answer pairs. For example, the electronic mail conversation thread illustrated in FIG. 1 above is retrieved from an associated electronic mail system for analysis and determination of whether one or more question and answer pairs are contained in the electronic mail thread. As described above, the retrieved conversation thread may be other forms of communication conversation items, for example, text message threads, discussion lists, discussion boards, message boards, combinations thereof, and the like.

At operation/system component 204, the retrieved conversation threads are passed to a conversation thread analyzer where the conversation threads may be processed for analysis as described herein. According to embodiments, the conversation thread analyzer may be in the form of a text parser operative to parse text contained in the retrieved conversation threads and associated metadata for processing the text into one or more text components (e.g., sentences and tokens comprising the one or more sentences). For example, if the conversation threads and associated metadata are formatted according to a structured data language, for example, Extensible Markup Language (XML), the conversation thread analyzer may be operative to parse the retrieved conversation threads and associated metadata according to the associated structured data language for processing the text as described herein. For another example, the conversation threads and associated metadata may be retrieved from an online source such as an Internet-based chat forum where the retrieved text may be formatted according to a formatting such as Hypertext Markup Language (HTML). As yet other examples, the conversation threads and associated metadata may be retrieved from instant messaging tools, or intranet or Internet web blogs. According to embodiments, the conversation thread analyzer may be operative to format the retrieved conversation threads and associated metadata from such a source so that it may be processed for question and answer detection analysis as described herein.

At operation/system component 206, the retrieved text is passed to a text processing application where the text is broken into one or more text components for determining whether the received/retrieved text may be contain a question, answer or question and answer pair. Breaking the text into the one or more text components may include breaking the text into individual sentences followed by breaking the individual sentences into individual tokens as described above. Such text processing is well known to those skilled in the art and may include breaking text portions into individual sentences and individual tokens according to known parameters. For example, punctuation marks and capitalization contained in a text portion may be utilized for determining the beginning and ending of a sentence. Spaces contained between portions of text may be utilized for determining breaks between individual tokens, for example, individual words, contained in individual sentences. Alphanumeric strings following known patterns, for example, five digit numbers associated with zip codes, may be utilized for identifying portions of text. In addition, initially identified sentences or sentence tokens may be passed to one or more recognizer programs for comparing initially identified sentences or tokens against databases of known sentences or tokens for further determining individual sentences or tokens. For example, a token (e.g., word or group of words such as "John Doe") contained in a given sentence may be passed to a database to determine whether the word is a person's name, the name of a city, the name of a company, or whether a particular token or sequence of tokens is a recognized acronym, trade name, or the like. As should be appreciated, a variety of means may be employed for comparing sentences or tokens of sentences against known, words, or other alphanumeric strings for further identifying those text items.

At operation/system component 208, the processed text, i.e., sentences and sentence tokens for the retrieved text and associated metadata are passed to a question detector application at operation/system component 210. As described above, the question detector is an application operative to extract features associated with processed text and metadata to determine, rank and filter candidate questions. At operation/system component 212, the question detector application conducts feature extraction associated with the processed text and associated metadata. For example, the question detector application may analyze the received sentences and sentence tokens for such features as communication author name, communication recipient name, communication transmission date/time, communication response date/time, existence of punctuation indicative of a question, such as for example, a question mark positioned at the end of an identified sentence or sentence token, and the like.

In addition, at operation/system component 211, the question detector application may utilize other data sources, for example, information from associated collaborative work spaces, projects, information associated with other users, lists or repositories of frequently asked questions (whereby the extracted features are compared to similar features contained in one or more frequently asked questions). In addition, the question detector application may compare extracted features with features contained in previously stored questions and answers stored in the QnA store, described herein.

At operation/system component 214, based on the feature extraction and analysis of extracted features, as described above, one or more candidate questions may be determined. For example, referring back to FIG. 1, based on features extracted for the email string 105, a candidate question of "What is the best ranking algorithm to use for product scaling?" may be initially determined. Next, a second candidate question may be determined from features extracted from the email string 110 to generate a candidate question of "Does that help".

At operation/system component 216, the candidate questions determined for the retrieved text may be ranked and filtered according to various parameters. For example, the question of "What is the best ranking algorithm to use for product scaling" may be ranked higher than the question of "Does that help?" because the first question includes words or terms, such as "ranking," "algorithm" and "product", and thus, the first question may be ranked higher than the second question "Does that help?" which does not appear to have relevance to any particular content, for example, a particular project or project item, for example, project documents. In addition, at operation/system component 216, a filtering operation may be conducted by the question detector application whereby certain questions may be filtered out altogether. For example, the second question determined from the email thread illustrated in FIG. 1 may be filtered out as not being necessary for subsequent storage in relation to a potential question answer. Because the second question appears to be conversational in nature and does not appear to add seek an answer that may serve as a needed stored knowledge item.

At operation/system component 218, the candidate questions along with the processed text and metadata utilized for determining the candidate questions are passed to an answer detector application at operation/system component 222. As should be appreciated, while the question detector and answer detector applications and operations are illustrated separately, these applications and operations may be performed by a single application and during the same operation where candidate answers are searched for or detected after detection of candidate questions.

At operation/system component 224, the answer detector application processes features of the processed text and associated metadata for determining whether any sentences or combinations of sentence tokens are candidates for answers to a determined question candidate. As with the question detector application, the features extracted by the answer detector application may be those features that may assist in establishing a sentence, sentence token or a group of several sentences as being or being associated with an answer. Such features may also be used by the answer detector application to link candidate answers with candidate questions.

At operation/system component 226, extracted text and/or metadata features may be used by the answer detector application for determining candidate answers to candidate questions. For example, such features as the communication author of a responsive communication to a communication that is determined as a candidate question may be used for determining that an associated sentence may be an answer to the candidate question. In the example, the feature may indicate the recipient of an email, instant messaging, or other communication. In addition, such features as punctuation, date and time of a given text string may be used in determining candidate answers. For example, if a candidate question is sent at 4:55 pm, and a candidate answer is sent 10 minutes later containing same or similar tokens, e.g., "project documents," the candidate answer may be determined as an appropriate pairing with the candidate question. As described above for the question detector application, the answer detector application may utilize other data sources at operation/component 211 for assisting in the determination of candidate answers.

At operation/component 227, the answer detector application may perform a similar ranking and filtering operation as the question detector application at operation/component 216. That is, sentences or sentence tokens identified as candidate answers may be ranked based on extracted features and based on a comparison of candidate answers with candidate questions. For example, a candidate answer that contains terms, such as, "project" or "by Wednesday," that are also contained in a candidate question may be used to rank the candidate answer high relative to the candidate question. Similarly, a candidate answer, such as the example "Works for me," illustrated in FIG. 1, may be ranked lower and may be filtered out because it does not contain words or terms of particular relevance or significance to a given topic.

As should be appreciated, the answer detector application may also find candidate answers for candidate questions from other sources. For example, the answer detector may search the QnA store 230, described below, directly for an answer to a given determined question. Similarly, other storage locations holding potential answers may be searched by the answer detector application for answers to determined questions.

At system component 228, candidate questions and candidate answers paired together based on the analysis of the candidate questions and answers in terms of the extracted features and the review of other data sources, described above with respect to operation/component 211, may be output for review and/or storage. For example, if the features associated with the example question "What is the best ranking algorithm to use for product scaling" (illustrated in FIG. 1) and the example answer "I would use the ABX algorithm developed by Sarah's team" indicate the designated question and designated answer should be paired, then they may be paired and stored together as a question and answer pairing in the QnA store at operation/component 230. For example, if features such as communication sender, communication responder, date/time of the communication and response, and information about the communication or about features obtained from other data sources indicate a designated question and a designated answer should be paired together, then they may be paired together and stored for subsequent use.

According to one embodiment, after an identified question is designated as a candidate question, and after an identified answer is designated as a candidate answer for the candidate question, the candidate question and answer combination may be presented to a user for verification, as illustrated and described above with reference to FIG. 1B. That is, the candidate question and answer combination may be presented in a user interface component to ask a user, for example, one of the users responsible for a portion of the communication thread from which the candidates were taken whether the candidate answer is an answer to the candidate question. The user may verify that the candidate answer is indeed an answer to the candidate question to enhance the question and answer detection methods and systems of the present invention. For example, the user may enhance the question and answer detection methods and systems by adding more information to the question or answer, or by reformulating the questions, followed by revising the answer to match the reformulated questions, and the like. If the user rejects the candidate answer as an answer to the candidate question, then the candidate answer may be discarded.

Once question and answer pairings are stored in the QnA store, as described herein, the pairings may be used in a similar manner as a frequently asked questions (FAQ) repository. Advantageously, the QnA store may contain questions and answers that fall outside a typical FAQ repository that are more particular and more relevant to a given organization or line of business. The QnA store may also be used by an online search engine. For example, an online web search engine may provide answers from the QnA store in response to matching questions entered by the user at the interface of the online search engine. The QnA store may be on the Internet or intranet of an enterprise. As such, the question and answer pairs may be private information to the enterprise or they may be information available to the general public.

As described herein, one or more question and answer pairs may be detected and stored for subsequent use. However, according to an alternate embodiment, one or more questions may be determined for which corresponding answers are not determined. In such a case, the detected and/or determined questions may be stored in the same manner as question and answer pairings for subsequent use either as standalone questions or in the detection and/or determination of answers to such questions.

Embodiments of the invention may be implemented via local and remote computing and data storage systems, including the systems illustrated and described with reference to FIGS. 1 and 2. Consistent with embodiments of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any other computing devices 318, in combination with computing device 300, wherein functionality may be brought together over a network in a distributed computing environment, for example, an intranet or the Internet, to perform the functions as described herein. The aforementioned system, device, and processors are examples and other systems, devices, and processors may comprise the aforementioned memory storage and processing unit, consistent with embodiments of the invention. Furthermore, computing device 300 may comprise operating environment 100 as described above. Operating environment 100 is not limited to computing device 300.

Figure 3:
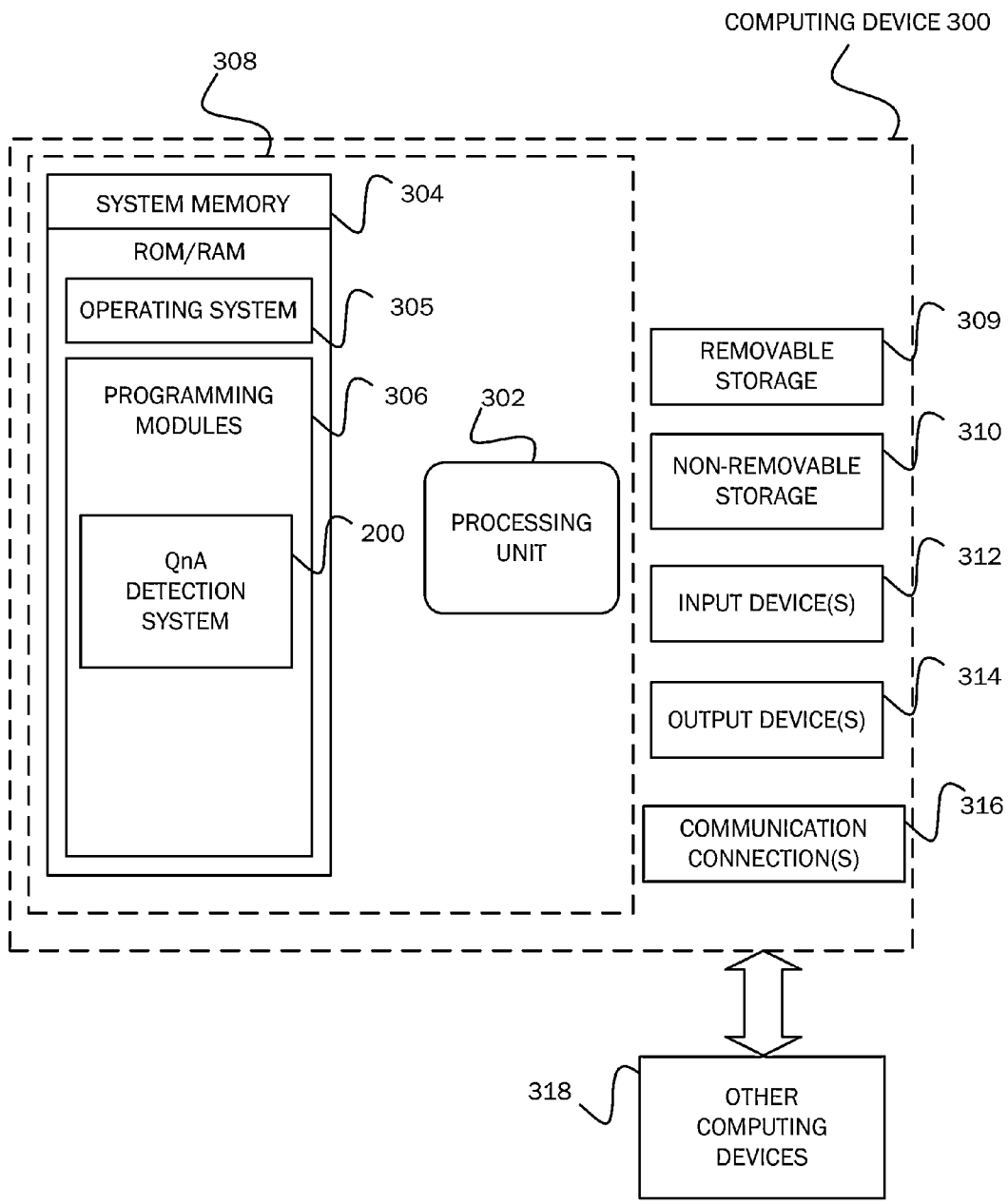
FIG. 3 is a block diagram of a system including a computing device with which embodiments of the invention may be practiced.

With reference to FIG. 3, a system consistent with embodiments of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include project data aggregation and management application 307 and filtering module 122, wherein project data aggregation and management application 307 and filtering module 122 are software applications having sufficient computer-executable instructions, which when executed, performs functionalities as described herein. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

As stated above, a number of program modules and data files may be stored in system memory 304, including operating system 305. While executing on processing unit 302, programming modules 306 and may include the question and answer detection system 200, described above, along with all of the component applications and modules of the system 200, described above, wherein the system 200 may contain sufficient computer-executable instructions, which when executed, perform functionalities as described herein. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 4:
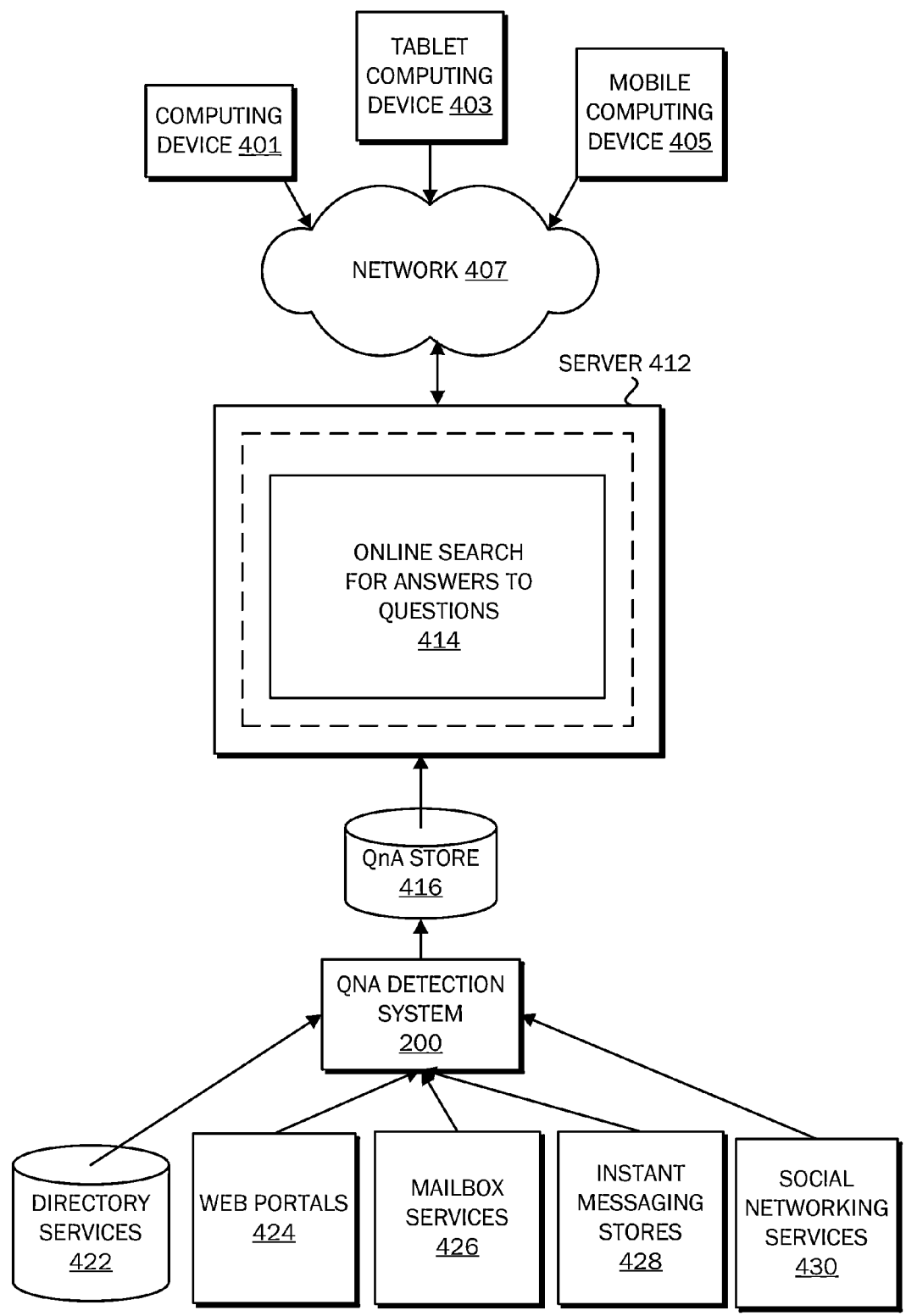
FIG. 4 is a block diagram of a system for providing answers to questions, using stored question answer pairs from a QnA store.

Referring to FIG. 4, a block diagram of a system for providing answers to questions, using stored question answer pairs from a QnA store is illustrated. As described previously, a QnA detection system 200 may obtain questions and answers using a variety of communication channels and stores. Features helpful to parsing questions and answers may also be stored in different communication channel or other storage types. For example, questions and answers or feature information may be stored using directory services 422, web portals 424, mailbox services 426 instant messaging stores 428 and social networking sites 430. The QnA detection system 200 may use any of these types of systems or the like to store questions and answer pairs in the QnA store 416. A server 412 may provide question and/or answer information to clients. As one example, server 412 may be a web server providing answers over the web. Server 414 may provide online answers over the web to clients through a network 407. Examples of clients that may obtain answers from questions include computing device 401, which may include any general purpose personal computer, a tablet computing device 403 and/or mobile computing device 405 which may include smart phones. Any of these devices may obtain answers to questions from the QnA store 416.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method of automatically detecting and designating question and answer pairs from electronic communications, comprising:

receiving an electronic communication;

initiating a question detection application for, analyzing one or more features extracted from the electronic communication associated with one or more text components separated from the electronic communication to determine whether the one or more extracted features indicate that the one or more text components are associated with a question based on a communication author, a communication recipient, a time duration between communications, and existence of a punctuation indicative of a question;

querying one or more data sources with the extracted one or more features to obtain information that may be used for determining whether the one or more text components is associated with a question;

if the one or more text components is associated with a question, designating a portion of the received electronic communication as a question; and querying a question-and-answer repository to identify whether the one or more text components is a previous question in a question and answer pair;

if the one or more text components is a previous question, retrieving the answer designated in the question and answer pair; and if the one or more text components is not a previous question, initiating an answer detection application for, extracting one or more additional features associated with one or more additional text components extracted from the received electronic communication for use in determining whether the one or more additional text components may be identified as an answer;

querying one or more data sources with the extracted one or more additional features to obtain information that may be used for determining whether the one or more additional text components is associated with an answer;

if the one or more additional text components is associated with an answer, designating a portion of the received electronic communication as an answer;

if the designated answer is designated as an answer to the designated question, initiating a confirmation interface to present the designated question and the designated answer to a user for verification that the designated answer is an answer to the designated question; and if the user verifies that the designated answer is an answer to the designated question, storing the designated question and the designated answer as a question and answer pair in the question-and-answer repository for subsequent use.

2. The method of claim 1, prior to analyzing the one or more extracted features associated with the one or more text components, separating the received electronic communication into one or more text components for use of the one or more text components for question and answer detection;

wherein separating the received communication into one or more text components for use of the one or more text components for question and answer detection includes passing the received first communication to a text processing module for separating the received first communication into one or more text components.

3. The method of claim 2 wherein separating the received first communication into one or more text components includes separating the received first communication into one or more text sentences.

4. The method of claim 2 wherein separating the received first communication into one or more text components includes separating the received first communication into one or more text tokens.

5. The method of claim 4, prior to analyzing the one or more extracted features associated with the one or more text components, passing the one or more text components to a question detection application for determining whether the one or more text components is associated with a question and extracting one or more features associated with the one or more text components, the one or more features for use in determining whether the one or more text components may be identified as a question.

6. The method of claim 1, further comprising formatting the first electronic communication to allow the first electronic communication to be separated into one or more text components for use of the one or more text components for question and answer detection.

7. The method of claim 6, prior to formatting the first electronic communication to allow the first electronic communication to be separated into one or more text components, passing the received first electronic communication to a conversation thread analyzer for formatting the first electronic communication to allow the first electronic communication to be separated into text components.

8. The method of claim 1, further comprising, if the one or more text components is designated as a question, and if the one or more additional text components is designated as an answer, applying a ranking to each of the designated question and the designated answer for determining whether the designated question and the designated answer should be designated and stored as a question and answer pair.

9. The method of claim 1 wherein receiving the first electronic communication includes receiving a text-based communication and receiving metadata associated with the text-based communication.

10. The method of claim 9, wherein receiving the first electronic communication includes receiving a first electronic mail communication.

11. The method of claim 9, wherein receiving the first electronic communication includes receiving a first electronic text message.

12. The method of claim 9, wherein receiving a first communication includes receiving a first text-based communication from an electronic discussion list.

13. A computer-readable medium, excluding communications media, containing computer readable instructions which when executed by a computer perform a method of automatically detecting and designating question and answer pairs from electronic communications, comprising:

receiving an electronic communication;

separating the received electronic communication into one or more text components for use of the one or more text components for question and answer detection;

initiating a question detection application for, extracting one or more features associated with the one or more text components, the one or more features for use in determining whether the one or more text components may be identified as a question;

analyzing the one or more extracted features associated with the one or more text components to determine whether the one or more extracted features indicate that the one or more text components are associated with a question based on a communication author, a communication recipient, a time duration between communications, and existence of a punctuation indicative of a question;

querying one or more data sources with the extracted one or more features to obtain information that may be used for determining whether the one or more text components is associated with a question;

if the one or more text components is associated with a question, designating a portion of the received electronic communication as a question; and
querying a question-and-answer repository to identify whether the one or more text components is a previous question in a question and answer pair;
if the one or more text components is a previous question, retrieving the answer designated in the question and answer pair; and
if the one or more text components is not a previous question, initiating an answer detection application for,
extracting one or more additional features associated with one or more additional text components extracted from the received electronic communication for use in determining whether the one or more additional text components may be identified as an answer;
if the one or more additional text components is associated with an answer, designating a portion of the received electronic communication as an answer;
presenting the designated question and the designated answer to a user for verification that the designated answer is an answer to the designated question;
if the designated answer is designated as an answer to the designated question, initiating a confirmation interface to present the designated question and the designated answer to a user for verification that the designated answer is an answer to the designated question; and
if the user verifies that the designated answer is an answer to the designated question, storing the designated question and the designated answer as a question and answer pair in the question-and-answer repository for subsequent use.

14. The computer readable medium of claim 13, further comprising querying one or more data sources with the extracted one or more additional features to obtain information that may be used for determining whether the one or more additional text components is associated with an answer.

15. The computer readable medium of claim 13, wherein separating the received communication into one or more text components for use of the one or more text components for question and answer detection includes passing the received first communication to a text processing module for separating the received first communication into one or more text components.

16. The computer readable medium of claim 15, wherein separating the received first communication into one or more text components includes separating the received first communication into one or more text tokens.

17. The computer readable medium of claim 13, prior to extracting one or more features associated with the one or more text components, passing the one or more text components to a question detection application for determining whether the one or more text components is associated with a question.

18. A system for automatically detecting and designating question and answer pairs from electronic communications, comprising:
a processing unit; and
a memory including computer readable instructions that, when executed by the processor, cause the system to provide:
an electronic communication system operative to provide an electronic communication;
a text processing module operative
to separate the received electronic communication into one or more text components for use of the one or more text components for question and answer detection;
a question detector module operative
to extract one or more features associated with the one or more text components, the one or more features for use in determining whether the one or more text components may be identified as a question;
to analyze the one or more extracted features associated with the one or more text components to determine whether the one or more extracted features indicate that the one or more text components are associated with a question based on a communication author, a communication recipient, a time duration between communications, and existence of a punctuation indicative of a question;
to query one or more data sources with the extracted one or more features to obtain information that may be used for determining whether the one or more text components is associated with a question;
to compare the extracted one or more features with features contained in previously questions for previous question and answer pairs in the question-and-answer repository;
to designate a portion of the received electronic communication as a question if the one or more text components is associated with a question;
an answer detector module operative
to extract one or more additional features associated with one or more additional text components extracted from the received electronic communication for use in determining whether the one or more additional text components may be identified as an answer;
to query one or more data sources with the extracted one or more additional features to obtain information that may be used for determining whether the one or more additional text components is associated with an answer;
to search the question-and-answer repository for a previous answer designated in a previous question and answer pair;
to designate a portion of the received electronic communication as an answer if the one or more additional text components is associated with an answer;
to initiate a confirmation interface to present the designated question and the designated answer to a user for verification that the designated answer is an answer to the designated question if the designated answer is designated as an answer to the designated question; and
to store the designated question and the designated answer as a question and answer pair in the question-and-answer repository for subsequent use if the user verifies that the designated answer is an answer to the designated question.

19. The system of claim 18, further comprising, if the one or more text components is designated as a question, and if the one or more additional text components is designated as an answer, to apply a ranking to each of the designated question and the designated answer for determining whether the designated question and the designated answer should be designated and stored as a question and answer pair.

20. The method of claim 18, wherein to separate the received electronic communication into one or more text components for use of the one or more text components for question and answer detection includes to pass the received first communication to a text processing module for separating the received first communication into one or more text components.

\* \* \* \* \*